(12) United States Patent
Takatsuka et al.

(10) Patent No.: US 9,232,539 B2
(45) Date of Patent: Jan. 5, 2016

(54) COMMUNICATION SYSTEM, COMMUNICATION TERMINAL, AND COMMUNICATION METHOD (75) Inventors: Yuya Takatsuka, Tokyo (JP); Takahisa Yamauchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 53 days.

(21) Appl. No.: 14/364,111

(22) PCT Filed: Jun. 14, 2012

(86) PCT No.: PCT/JP2012/065244
§ 371 (c)(1),
(2), (4) Date: Jun. 10, 2014

(87) PCT Pub. No.: WO2013/125061
PCT Pub. Date: Aug. 29, 2013

(65) Prior Publication Data
US 2014/0376527 A1 Dec. 25, 2014

(30) Foreign Application Priority Data
Feb. 20, 2012 (JP) ................................. 2012-034218

(51) Int. Cl.
*H04J 3/00* (2006.01)
*H04W 74/02* (2009.01)
*H04L 12/733* (2013.01)
*H04W 84/18* (2009.01)

(52) U.S. Cl.
CPC ............... *H04W 74/02* (2013.01); *H04L 45/20* (2013.01); *H04W 84/18* (2013.01)

(58) Field of Classification Search
None
See application file for complete search history.

(56) References Cited

U.S. PATENT DOCUMENTS

| 6,047,190 A | 4/2000 | Haleem et al. |
| 7,257,136 B2 * | 8/2007 | Mori ................... B23K 26/422 |
| | | 219/121.62 |

(Continued)

FOREIGN PATENT DOCUMENTS

| JP | 11-150755 | 6/1999 |
| JP | 2002-325273 | 11/2002 |

(Continued)

OTHER PUBLICATIONS

International Search Report issued Jul. 17, 2012, in PCT/JP2012/065244, filed Jun. 14, 2012.

(Continued)

*Primary Examiner* — Duc C Ho
(74) *Attorney, Agent, or Firm* — Oblon, McClelland, Maier & Neustadt, L.L.P.

(57) ABSTRACT

A terminal mode of at least a part of terminals in a centralized control area and terminals in a distributed control area is set to a time division control mode for performing communication in a time division manner. The terminals in the centralized control area, the terminal mode of which is other than the time division control mode, are set in a centralized control mode. The terminals, the terminal mode of which is other than the time division control mode, are set in a distributed control mode. The terminals set in the time division control mode perform transmission in a communication period in which communication is permitted. The terminals set in the centralized control mode and the terminals set in the distributed control mode perform communication without depending on the communication period.

20 Claims, 7 Drawing Sheets

(56) References Cited

U.S. PATENT DOCUMENTS

| | | | |
|---|---|---|---|
| 8,488,570 B2 | 7/2013 | Imaeda | |
| 8,515,438 B2 * | 8/2013 | Imamura | H04W 74/04 370/337 |
| 2003/0125087 A1 | 7/2003 | Shimizu | |
| 2006/0025124 A1 | 2/2006 | Matsumoto | |

FOREIGN PATENT DOCUMENTS

| | | |
|---|---|---|
| JP | 2003-198564 | 7/2003 |
| JP | 2004-297400 | 10/2004 |
| JP | 2004-364069 | 12/2004 |
| JP | 2005-295108 | 10/2005 |
| JP | 2007-6199 | 1/2007 |
| JP | 2007-129405 | 5/2007 |
| JP | 2007-259079 | 10/2007 |
| JP | 2010-11203 | 1/2010 |

OTHER PUBLICATIONS

Anis Ouni, et al., "Joint TDMA/CSMA scheduling for solving the bottleneck issue in Wireless Mesh Networks", INRIA Research Report, Version 1, N° 7442, Oct. 2010, 17 pages.

Kohei Mizuno, et al., "A Performance of Multi-channnel Polling/CSMA Protocols for Wireless Multi-hop Networks", The Institute of Electronics, Information and Communication Engineers, vol. 101, No. 91, May 2001, pp. 63-70 (with English Abstract).

"Wireless Medium Access Control (MAC) and Physical Layer (PHY) Specifications for Low-Rate Wireless Personal Area Networks (WPANs)", IEEE STD 802.15.4, Part 15.4, Sep. 8, 2006, 322 pages.

* cited by examiner

| TRANSMISSION SOURCE TERMINAL IDENTIFIER | NUMBER OF TRANSMISSION DATA |
|---|---|
| 20-1 | 1 |
| 20-2 | 5 |
| 20-3 | 2 |
| 20-4 | 3 |
| 20-5 | 5 |
| 20-6 | 2 |
| 20-7 | 4 |
| 20-8 | 2 |
| 20-9 | 3 |
| 20-10 | 2 |

FIG.11

| TERMINAL IDENTIFIER | NUMBER OF RECEPTION DATA | NUMBER OF HOPS |
|---|---|---|
| 20-1 | 18 | 1 |
| 20-2 | 5 | 1 |
| 20-3 | 11 | 2 |
| 20-4 | 2 | 2 |
| 20-5 | 0 | 2 |
| 20-6 | 3 | 3 |
| 20-7 | 2 | 3 |
| 20-8 | 0 | 3 |
| 20-9 | 0 | 4 |
| 20-10 | 0 | 4 |

FIG.12

COMMUNICATION SYSTEM, COMMUNICATION TERMINAL, AND COMMUNICATION METHOD

FIELD

The present invention relates to a communication system, a communication terminal, and a communication method.

BACKGROUND

Data collection in large-scale networks, in which specified low power radio is used, such as telemetering and monitoring in a large factory is examined. In these networks, PHY (physical layer)/MAC (Medium Access Control) standardized by IEEE (The Institute of Electrical and Electronics Engineers) 802.15.4 is used. Data is collected from a wide range and a large number of terminals by multihop. In a CSMA/CA (Carrier Sense Multiple Access with Collision Avoidance) system, which is a radio access system standardized by IEEE802.15.4, respective terminals perform standby for a back-off time and carrier sense of a radio channel prior to packet transmission. When the terminals confirm with the carrier sense that the channel is in use (channel busy), the terminals perform the standby for the back-off time again (see Non Patent Literature 1).

On the other hand, there is proposed an access system for applying a centralized control-type access system and an autonomous distributed control-type access system in a time division manner for each of radio stations and each of radio channels (see, for example, Patent Literature 1). In the access system, when the radio station functions as a master station, the radio station transmits a signal according to control by the own station. When the radio station functions as a slave station, the radio station transmits a signal according to control by a master station. The radio station communicates with the other radio stations directly or via the other one or more radio stations. Consequently, the access system realizes guarantee of a low delay, low delay fluctuation, high throughput, and high QoS.

As another system for performing the time division control, there is proposed a media access control system for forming an upstream with a contention period and a contention-free period in a system including a base station, a relay station, and a subscriber station (see, for example, Patent Literature 2). In the media access control system, data is transmitted from the subscriber station to the relay station in the contention period. Data is transmitted from the relay station to the base station in the contention-free period. This enables communication between the subscriber station and the base station via the relay station.

CITATION LIST

Patent Literature

Patent Literature 1: Japanese Patent Application Laid-Open No. 2002-325273
Patent Literature 2: Japanese Patent Application Laid-Open No. 2007-6199

Non Patent Literature

Non Patent Literature 1: IEEE, "IEEE Std IEEE802.15.4", September 2006

SUMMARY

Technical Problem

As explained above, as the related technology for reducing interference in a network, there are provided the CSMA/CA system, the system for switching an access system and a communicable link in a time division manner, and the like. However, in the CSMA/CA system, there is a problem in that interference increases according to an increase in the number of terminals and a communication frequency.

On the other hand, as the system for switching an access system and a communicable link in a time division manner, there are many systems related to a network of a single hop for directly communicating with a communication partner and a network of two hops for communicating with a communication partner through one relay station. There are few systems examined concerning a multihop environment of three or more hops. When the system is applied to the multihop environment of three or more hops to cause all terminals to operate in a time division manner, even communication of terminals not interfering with one another is sometimes prohibited. Communication efficiency is thus deteriorated. Further, when centralized control and distributed control are switched according to a communication area, there is a problem in that interference occurs near a boundary between the centralized control and the distributed control.

The present invention has been devised in view of the above and it is an object of the present invention to obtain a communication system, a communication terminal, and a communication method that can improve throughput when centralized control and distributed control are mixed in a multihop environment and reduce interference near a boundary between the centralized control and the distributed control.

Solution to Problem

To solve the problems as described above and to achieve an object, the present invention is a communication system which includes a plurality of communication terminals, the communication system being capable of setting a centralized control area where centralized control for carrying out communication according to control by a master terminal is carried out and a distributed control area where distributed control for carrying out communication according to autonomous distributed control is carried out, wherein the communication system sets a terminal mode of the communication terminals including the communication terminal located in a boundary between the centralized control area and the distributed control area to a time division control mode for performing communication in a time division manner, sets the communication terminal in the centralized control area, the terminal mode of which is other than the time division control mode, in a centralized control mode, and sets the communication terminal in the distributed control area, the terminal mode of which is other than the time division control mode, in a distributed control mode, the communication terminal set in the time division control mode performs transmission in a communication period in which communication is permitted, and the communication terminal set in the centralized control mode and the communication terminal set in the distributed control mode perform communication without depending on the communication period.

Advantageous Effects of Invention

The communication system, the communication terminal, and the communication method according to the present invention attains an effect that it is possible to improve throughput when centralized control and distributed control are mixed in a multihop environment and reduce interference near a boundary between the centralized control and the distributed control.

DESCRIPTION OF EMBODIMENTS

Embodiments of a communication system, a communication terminal, and a communication method according to the present invention are explained in detail below with reference to the drawings. Note that the present invention is not limited by the embodiments.

First Embodiment

Figure 1:
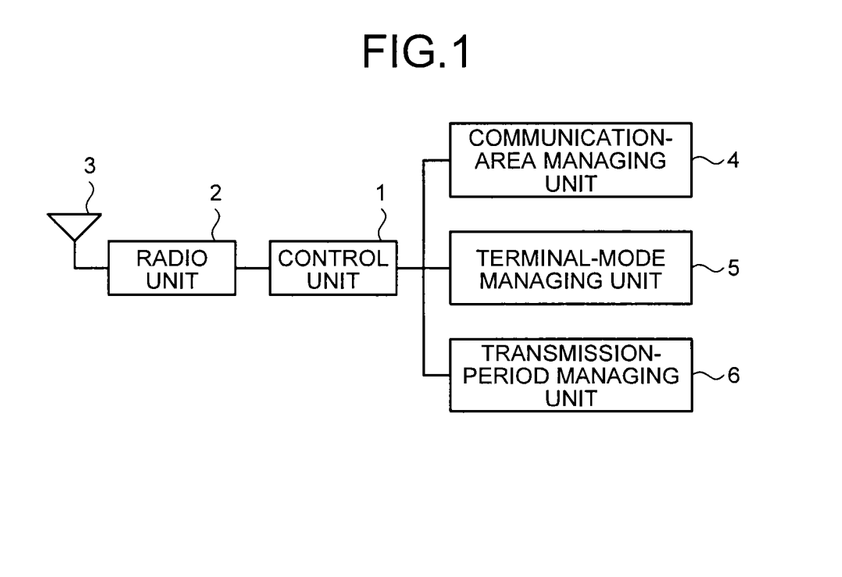
FIG. 1 is a diagram of a configuration example of a terminal in a first embodiment.

FIG. 1 is a diagram of a configuration example of a first embodiment of a terminal (a communication terminal) according to the present invention. As shown in FIG. 1, the terminal in this embodiment includes a control unit 1, a radio unit 2, an antenna 3, a communication-area managing unit 4, a terminal-mode managing unit 5, and a transmission-period managing unit 6.

The antenna 3 is an antenna for performing radio communication with other terminals. The antenna 3 receives a transmission signal from the radio unit 2, transmits the transmission signal as a radio wave, and passes a reception signal to the radio unit 2. The radio unit 2 performs modulation and the like on the basis of transmission data received from the control unit 1 to generate a transmission signal and passes reception data obtained by performing modulation and the like of the reception signal to the control unit 1. The control unit 1 performs control of the transmission and reception data, passes the transmission data to the radio unit 2, and receives the reception data from the radio unit 2. The control unit 1 selects appropriate transmission timing and an appropriate communication system in cooperation with the communication-area managing unit 4, the terminal-mode managing unit 5, and the transmission-period managing unit 6.

The communication-area managing unit 4 manages a communication area (a centralized control area or a distributed control area) where the own terminal is present and determines and sets the communication area where the own terminal is present. The terminal-mode managing unit 5 manages a terminal mode of the own terminal and sets the terminal mode of the own terminal to any one of a centralized control mode, a distributed control mode, and a time division control mode. The transmission-period managing unit 6 manages transmittable timing of the own terminal and determines transmission possibility when the own terminal operates in a time division manner.

Figure 2:
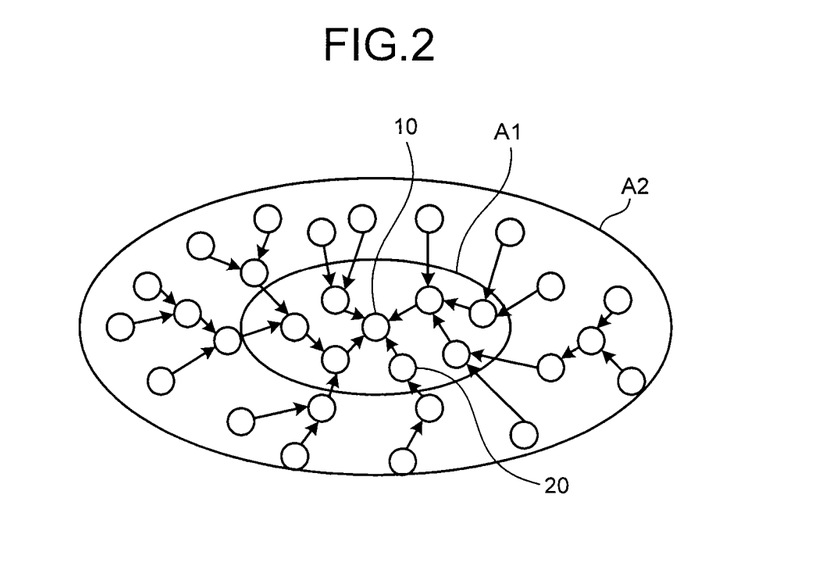
FIG. 2 is a diagram of a configuration example of a communication system in the first embodiment.

FIG. 2 is a diagram of a configuration example of a communication system assumed in this embodiment. Note that the configuration of the communication system shown in FIG. 2 is an example. The configuration of the communication system applied with an access control system and a terminal in this embodiment is not limited to the example shown in FIG. 2. As shown in FIG. 2, a network is configured by a plurality of terminals (a terminal 10 and a terminal 20). Data generated by the terminal 20 is transmitted to the terminal 10 directly or being relayed by another terminal 20. Note that, in FIG. 2, one terminal 20 is denoted by the reference numeral for simplification of the figure. However, respective circles shown in FIG. 2 other than the terminal 10 indicate the terminals 20, although not denoted by the reference numeral. The terminal 20 is the terminal in this embodiment, the configuration of which is shown in FIG. 1.

The terminal 10 (a data collection terminal) is an arbitrary terminal that collects data. The terminal 10 can be selected as one of the terminals 20 configuring the communication system. Alternatively, a terminal like a gateway including a specific function other than the function of the terminal 20 can be used as the terminal 10. The terminal 10 functions as a master terminal that controls transmission by the terminals 20 in the centralized control. Note that it is assumed that routes from the terminals 20 to the terminal 10 are already built. A method for route building is not limited. A normal route building method in a multihop network can be used. The terminals 20 grasp the number of hops from the terminal 10 through the route building. The terminal-mode managing unit 5 retains the number of hops from the terminal 10.

In the network, a centralized control area A1 and a distributed control area A2 are set centering on the terminal 10. In communication in the centralized control area A1, a specific terminal centrally controls communications such that communications of the terminals do not interfere with one another. In the distributed control area A2, the terminals operate in an autonomous distributed manner. Therefore, it is likely that the communications of the terminals interfere with one another because of transmission timings and a hidden terminal problem.

Figure 3:
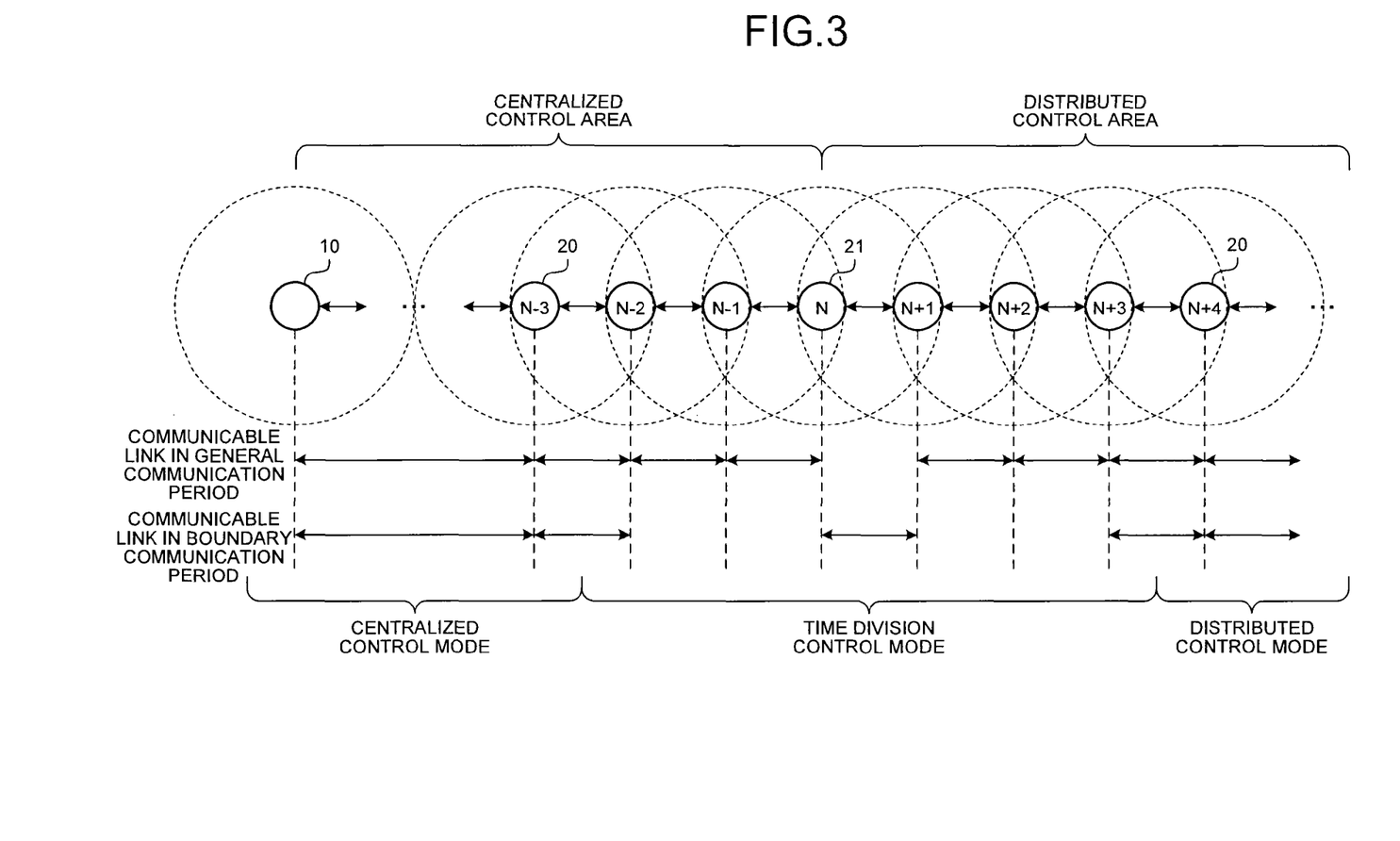
FIG. 3 is a diagram for explaining details concerning a specific route in the configuration example shown in FIG. 2.

FIG. 3 is a diagram for explaining details of a specific route in the configuration example shown in FIG. 2. The terminal 10 shown in FIG. 3 is a terminal that collects data from the other terminals. The terminal 20 transmits data to the terminal 10 directly or through the other terminals. Note that, in FIG. 3, only the two terminals are denoted by the reference numerals. However, circles present between the two terminals also indicate the terminals 20. In the circles indicating the terminals 20, the numbers of hops from the terminal 10 are described.

As shown in FIG. 3, it is assumed that the terminal 10 to the terminal 20 in an Nth hop (N is an integer equal to or larger than 1) are within the centralized control area A1 and the terminal 20 in an N+1th hop and the subsequent terminals 20 are within the distributed control area A2. A terminal 21 is one of the terminals 20 and is a terminal in the Nth hop from the terminal 10 and located in a boundary with the distributed control area A2 in the centralized control area A1.

Figure 4:
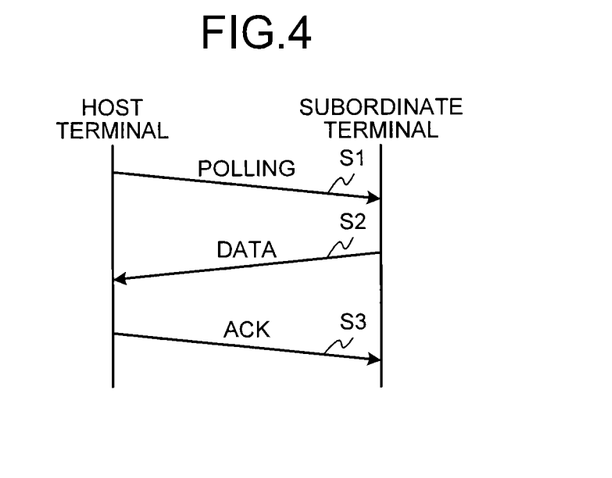
FIG. 4 is a diagram of an example of a communication sequence of terminals in a centralized control area.

FIG. 4 is a diagram of an example of a communication sequence of the terminals (the terminal 10 and the terminal 20) in the centralized control area A1. In the following explanation, in a link among terminals, the terminal on the terminal 10 side is referred to as host terminal and the terminals on the end side are referred to as subordinate terminals. As shown in FIG. 4, the host terminal in the centralized control area A1 transmits POLLING to the subordinate terminals in the centralized control area A1 to start communication (step S1). The POLLING includes identifiers of the subordinate terminals that request DATA.

Among the subordinate terminals that receive the POLLING, the terminal having a designated identifier transmits the DATA to the host terminals (step S2). Note that, when the subordinate terminal, which receives the POLLING, does not retain data to be transmitted, the subordinate terminal can transmit NULL DATA not including a payload or respond with nothing. Note that, in the explanation in this embodiment, the subordinate terminal transmits the NULL DATA. The host terminal, which receives the DATA or the NULL DATA, returns ACK (Acknowledgement) according to necessity to complete the communication (step S3). In FIG. 4, the ACK is transmitted as an independent packet. However, it is also possible to reduce the number of transmission packets by including ACK information in POLLING to be transmitted next and transmitting the POLLING. Note that a terminal in an Nth hop (hereinafter referred to as Nth hop terminal), which is a most subordinate terminal in the centralized control area A1 in FIG. 3, does not transmit POLLING from the own terminal.

Timings when the terminals in the centralized control area A1 transmit the POLLING are timings when the transmission does not interfere with the other communications in the centralized control area A1. As control for transmitting the POLLING at the timings when the transmission does not interfere with the other communications, the terminal 10, which collects data, can control communications in the entire centralized control area A1. Alternatively, the terminals can exchange information concerning transmission timings in advance with the terminals in the centralized control area A1 to control POLLING transmission timing of the own terminals. A method of performing polling communication in which the communications of the terminals do not interfere with one another in the centralized control area is not limited. In the above explanation, the method of centrally controlling the communications with the subordinate terminals, with which the terminals directly communicate, respectively using the POLLING is explained. However, it is also possible that the terminal 10 transmits the POLLING to any terminal in the centralized control area and the terminal in the centralized control area transfers the POLLING to a destination terminal.

Figure 5:
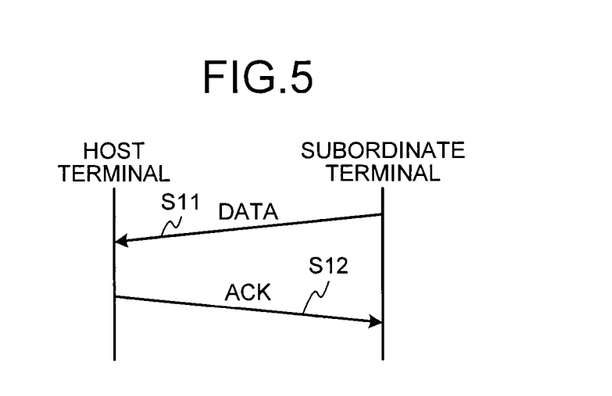
FIG. 5 is a diagram of an example of a communication sequence in a distributed control area.

FIG. 5 is a diagram of an example of a communication sequence in the distributed control area A2. The terminals 20 operate in CSMA/CA. The subordinate terminal, which retains data to be transmitted, performs standby for a back-off time determined at random and carrier sense. When the subordinate terminal determines with the carrier sense that a channel is idle, the subordinate terminal transmits DATA to the host terminal (step S11). The host terminal, which receives the DATA, returns ACK according to necessity to complete communication (step S12). Note that a detailed operation is described in Non Patent Literature 1.

In the terminals, the terminal-mode managing unit 5 sets terminal modes as shown in FIG. 3. In this embodiment, the terminal modes are three terminal modes, i.e., a centralized control mode, a distributed control mode, and a time division control mode. The terminals are set in any one of the three modes of the centralized control mode, the distributed control mode, and the time division control mode on the basis of the numbers of hops (from the terminal 10) of the terminals 21 in a boundary between the centralized control area A1 and the distributed control area A2 (hereinafter referred to as boundary terminals) and the numbers of hops from the boundary terminals of the terminals. Note that the terminals 20 grasp the number of hops from the terminal 10 of the boundary terminals, that is, N by, for example, being set in advance or being notified from the terminal 10.

The terminals set in the centralized control mode are terminals up to N−3 hops from the terminal 10. The terminals always perform communication according to the centralized control (the procedure shown in FIG. 4).

The terminals set in the distributed control mode are terminals N+4 hops or more from the terminal 10. The terminals always perform communication according to the distributed control (the procedure shown in FIG. 5).

The terminals set in the time division control mode are terminals other than the terminals in the centralized control mode and the distributed control mode and are terminals, the numbers of hops of which from the terminal 10 are N−2 hops to N+3 hops. The terminals perform communication according to the communication sequence (the centralized control or the distributed control) in communication areas to which the terminals belong. However, the terminals control, in a time division manner, a link in which communication can be started from the own terminals. The terminals synchronize with one another. The transmission-period managing units 6 of the terminals switch a general communication period and a boundary communication period according to a predetermined rule in a time division manner and control transmission to perform communication only in a link permitted in the communication periods.

In this embodiment, the general communication period indicates a period in which communication in the same communication area (the centralized control area A1 or the distributed control area A2) is possible. The boundary communication period indicates a period in which communication between the centralized control area A1 and the distributed control area A2 is possible. In the following explanation, a terminal Mth hop (M is an integer equal to or larger than 1) from the terminal 10 is referred to as Mth hop terminal (e.g., the terminal 20 in an N−1th hop from the terminal 10 is referred to as N−1th hop terminal). Links communicable in the general communication period are a link between an N−2th hop terminal and the N−1th hop terminal, a link between the N−1th hop terminal and the Nth hop terminal, a link between an N+1th hop terminal and an N+2th hop terminal, and a link between the N+2th hop terminal and an N+3th hop terminal. DATA transmission from the N+1th hop terminal is prohibited. Note that the link between the N−2th hop terminal and the N−1th hop terminal and the link between the N−1 hop terminal and the Nth hop terminal belong to the centralized control area A1. Therefore, communication is performed according to the centralized control shown in FIG. 4. The link between the N+1th hop terminal and the N+2th hop terminal and the link between the N+2th hop terminal and the N+3th hop terminal belong to the distributed control area A2. Therefore, communication is performed according to distributed control shown in FIG. 5.

On the other hand, a link communicable in the boundary communication period is a link between the Nth hop terminal and the N+1th hop terminal. POLLING transmission from the N−2th hop terminal and the N−1th hop terminal and DATA transmission from the N+2th hop terminal and the N+3 hop terminal are prohibited. Note that the link belongs to the distributed control area. Therefore, communication is performed according to the distributed control shown in FIG. 5. However, the communication in the link can also be performed according to the centralized control.

The terminals in the centralized control mode and the distributed control mode can communicate in both of the general communication period and the boundary communication period.

In the example explained in this embodiment, the centralized control mode, the distributed control mode, and the time division control mode are set on the basis of the number of hops. However, the terminal modes can also be set taking into account not only the number of hops but also reception power. For example, a terminal set in the time division control mode is assumed to be a terminal likely to interfere with communication between the Nth hop terminal and the N+1th hop terminal. Terminals that interfere with communication between the Nth hop terminal and the N+1th hop terminal in the centralized control area are a terminal (assumed to be the terminal A) in a communication range of the Nth hop terminal and on the data collection terminal side and a terminal in a communication range of the terminal A and on the data collection terminal side. Terminals corresponding to these terminals are set in the time division control mode. Specifically, for example, the Nth hop terminal and the terminal A measure reception power from the terminals 20 and determine terminals in communication ranges. The Nth hop terminal and the terminal A transmit results of the determination (results of the measurement of reception power) to the data collection terminal. The data collection terminal determines, on the basis of the determination results, a terminal that interferes with the communication between the Nth hop terminal and the N+1th hop terminal in the centralized control area and instructs the terminal to set the time division control mode. Consequently, it is possible to avoid interference due to POLLING and DATA transmission of the terminal A. On the other hand, terminals that interfere with communication between the Nth hop terminal and the N+1th hop terminal in the distributed control area A2 are a terminal (assumed to be a terminal B) in a communication range of the N+1th hop terminal and on the end side and a terminal in a communication range of the terminal B and on the end side. Terminals corresponding to these terminals are set in the time division control mode. Consequently, it is possible to avoid interference due to DATA and ACK transmission of the terminal B.

In this embodiment, in the time division control mode, only a communication starts from the own terminal is controlled in a time division manner. Therefore, outside a communication period allocated to the own terminal, DATA transmission responding to POLLING and ACK transmission responding to DATA are performed. However, terminals set in the time division control mode can be limited to the N−1th hop terminal, the Nth hop terminal, the N+1th hop terminal, and the N+2th hop terminal by prohibiting all communications including the DATA transmission responding to POLLING and the ACK transmission responding to DATA outside the communication period allocated to the own terminal.

Further, when it is determined that communication in the distributed control area is little, the terminals set in the time division control mode can be reduced by changing the N+3th hop terminal from the time division control mode to the distributed control mode and, when interference occurs in the N+2th hop terminal, solving the interference by performing retransmission. In this way, a range of the terminals set in the time division control mode because of a state of interference or the like can be set smaller than the range of the N−2th hop terminal to the N+3th hop terminal shown in FIG. 3 or, conversely, can be set larger than the range shown in FIG. 3.

In the boundary communication period, interference from an adjacent path can be reduced by prohibiting POLLING transmission of terminals in the communication range of the Nth hop terminal and DATA response to POLLING.

Terminals in the centralized control area A1 in this embodiment do not transmit DATA until the terminals receive POLLING. Therefore, in buffers (not shown in the figure) of the terminals, data generated until POLLING is received and DATA received from the subordinate terminals are accumulated. In terminals set in the time division control mode, data generated outside communication period of the own terminals and DATA received from the subordinate terminals are accumulated. Therefore, it is also possible to reduce header overheads and avoid a buffer overflow according to aggregated transmission (aggregate transmission) and continuous transmission (burst transmission) of packets accumulated in the buffers.

As explained above, in this embodiment, in a multihop environment, it is possible to suppress interference near the data collection terminal where a communication packet amount increases and improve throughput by setting an area near the terminal 10 as the centralized control area A1 and setting an area beyond the terminal 10 as the distributed control area A2. It is possible to improve communication efficiency by classifying the terminals into the centralized control mode, the distributed control mode, and the time division control mode and enabling the terminals 20 not interfering with each other in the centralized control area A1 and the distributed control area A2 (the terminals 20 set in the centralized control mode and the distributed control mode) to always communicate with each other. Further, it is possible to reduce interference near a boundary between the centralized control area and the distributed control area and improve throughput by setting terminals near the boundary between the centralized control area A1 and the distributed control area A2 in the time division control mode and causing communication in a boundary link (a link across the boundary between the centralized control area A1 and the distributed control area A2) and the other communications to operate in a time division manner.

Second Embodiment

Figure 6:
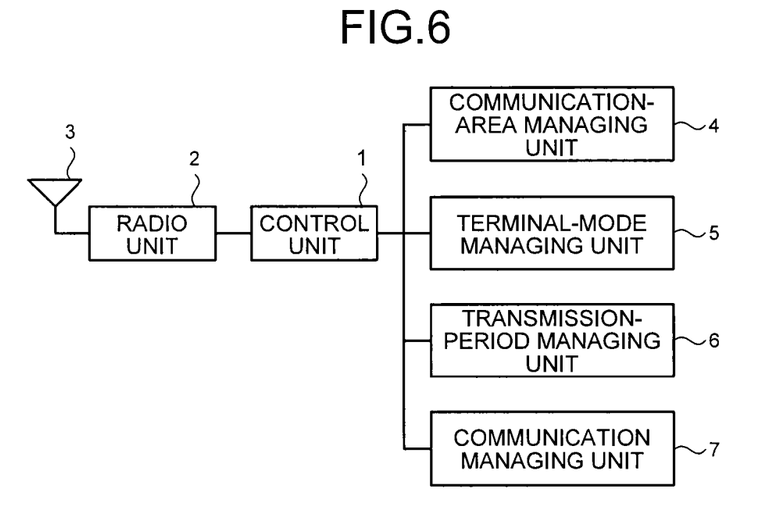
FIG. 6 is a diagram of a configuration example of a terminal in a second embodiment.

FIG. 6 is a diagram of a functional configuration example in a second embodiment of the terminal according to the present invention. In the terminal in this embodiment, a communication managing unit 7 is added to the configuration of the terminal shown in FIG. 1 in the first embodiment. The communication managing unit 7 performs management concerning communication quality such as a PER (Packet Error Rate) of a packet received by the own terminal and a NULL DATA reception ratio to transmitted POLLING. Components having functions same as the functions in the first embodiment are denoted by reference numerals same as the reference numerals in the first embodiment and redundant explanation of the components is omitted. In this embodiment, differences from the first embodiment are mainly explained.

The configuration of a communication system in this embodiment is set the same as the configuration shown in FIG. 2 in the first embodiment. The terminal 20 shown in FIG.

2 is the terminal in this embodiment shown in FIG. 6. The terminal 10 can be the terminal in this embodiment shown in FIG. 6. Alternatively, a terminal like a gateway including a specific function other than the function of the terminal 20 can be used as the terminal 10. However, in this embodiment, two network configurations, i.e., a centralized/distributed control mixed network (a mixed network configuration) configured by the centralized control area A1 and the distributed control area A2 same as those shown in FIG. 2 and a distributed control network (a distributed control network configuration) in which all terminals operated according to distributed control without distinguishing the centralized control area A1 and the distributed control area A2 are switched according to a state.

An operation in this embodiment performed when the centralized/distributed control mixed network is configured is the same as the operation in the first embodiment. An operation in this embodiment performed when the distributed control network is configured is the same as the operation of the normal distributed control network.

Figure 7:
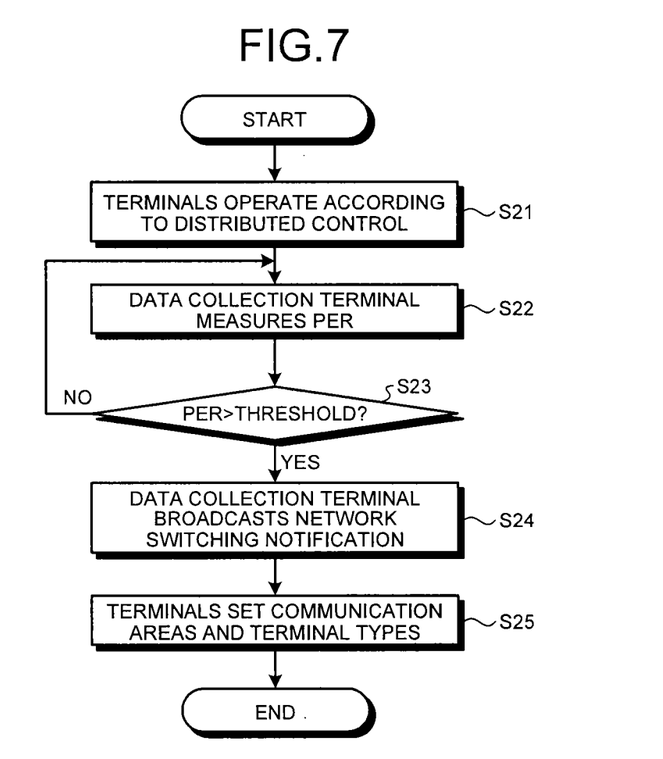
FIG. 7 is a flowchart for explaining an example of a switching procedure from a distributed control network to a centralized/distributed control mixed network.

FIG. 7 is a flowchart for explaining an example of a switching procedure from the distributed control network to the centralized/distributed control mixed network. First, assuming that the communication system is set in the distributed control network, the terminals (the terminal 10 and the terminal 20) are set in the distributed control mode and performs communication according to the distributed control explained in the first embodiment (step S21).

In the data collection terminal (the terminal 10), the communication managing unit 7 measures a PER of a reception packet (step S22). The data collection terminal determines whether the measured PER in a fixed time exceeds a predetermined threshold (step S23). When the PER does not exceed the threshold (No at step S23), the data collection terminal returns to step S22. When the PER exceeds the threshold (Yes at step S23), the communication managing unit 7 of the data collection terminal determines that a network in the communication system is congested, determines switching from the distributed control network to the centralized/distributed control mixed network, and broadcasts a switching notification for notifying the switching from the distributed control network to the centralized/distributed control mixed network (step S24).

Note that a broadcast range can be the entire communication system. However, overhead due to the broadcast can be reduced by setting the broadcast range to a range up to the N+3th hop terminal. The network switching notification includes a network type after the switching (the centralized/distributed control mixed network), the number of hops N from the data collection terminal of a terminal in a boundary between a centralized control area and a distributed control area, and values indicating a general communication period and a boundary communication period. The values of the general communication period and the boundary communication period are, for example, time when time division control of the general communication period and the boundary communication period is started and lengths of the periods. Note that the values indicating the general communication period and the boundary communication period are not limited to these and only have to be values with which switching timing of the periods is known. In this embodiment, as information (setting information) for the terminals 20 to set terminal modes, the number of hops N from the data collection terminal of the terminal in the boundary between the centralized control area and the distributed control area is notified. However, information for the terminals 20 to determine terminal modes of the own terminals is not limited to this (e.g., the number of hops corresponding to each of the terminal modes can be notified).

In the terminals that receive the switching notification, the communication-area managing unit 4 sets a communication area of the own terminal on the basis of the notification (step S25). Specifically, among the terminals that receive the switching notification from the data collection terminal, the terminals from the data collection terminal to the Nth hop terminal set communication areas in the centralized control area A1. The N+1th hop terminal and the subsequent terminals set communication areas in the distributed control area A2. The terminals from the data collection terminal to the N−3th hop terminal are set in the centralized control mode. The N+4th hop terminal and the subsequent terminals are set in the distributed control mode. The terminals from the N−2th hop terminal to the N+3th hop terminal are set in the time division control mode. Thereafter, the operations of the terminals in the centralized control mode, the distributed control mode, and the time division control mode are the same as the operations in the first embodiment.

Figure 8:
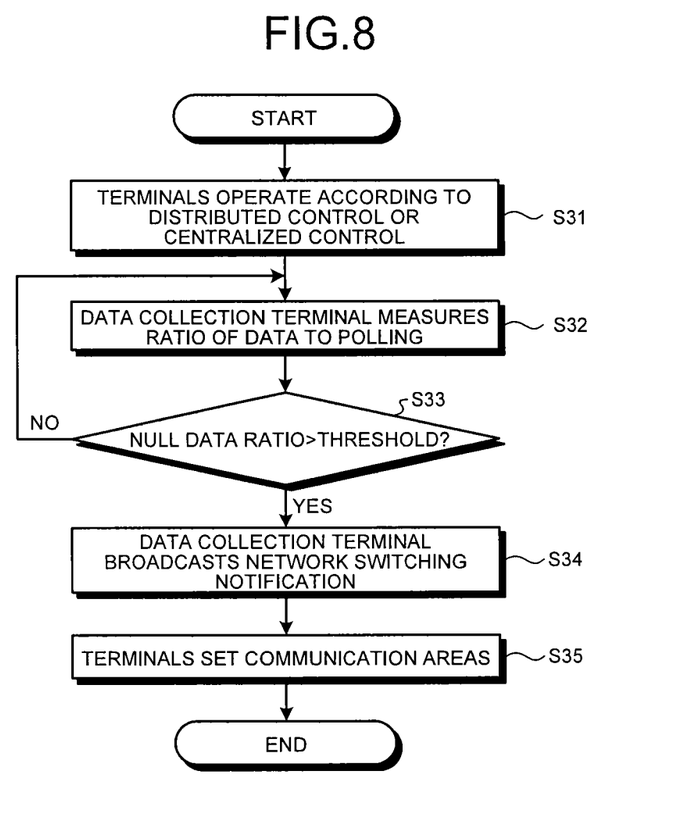
FIG. 8 is a flowchart for explaining an example of a switching procedure from the centralized/distributed control mixed network to the distributed control network.

FIG. 8 is a flowchart for explaining an example of a switching procedure from the centralized/distributed control mixed network to the distributed control network. First, assuming that the communication system is set in the centralized/distributed control mixed network, the terminals perform, according to set terminal modes of the own terminals, communication according to the operation explained in the first embodiment (step S31).

The communication managing unit 7 of the data collection terminal measures a ratio of NULL DATA to POLLING (step S32).

The data collection terminal determines whether the measured ratio of NULL DATA to POLLING in a fixed period exceeds a predetermined threshold (step S33). When the ratio does not exceed the threshold (No at step S33), the data collection terminal returns to step S32. When the ratio exceeds the threshold (Yes at step S33), the data collection terminal determines that a network in the communication system is idle, determines switching from the centralized/distributed control mixed network to the distributed control network, and broadcasts a switching notification for notifying the switching from the centralized/distributed control mixed network to the distributed control network (step S34). Note that, in this case, as in the case explained above, it is possible to reduce overhead due to the broadcast by setting a broadcast range to a range up to the N+3th hop terminal. The network switching notification includes a network type after the switching (the distributed control network).

In the terminals that receive the network switching notification from the data collection terminal, the communication-area managing unit 4 sets a communication area of the own terminal according to the switching notification (step S35). Specifically, the terminals from the data collection terminal to the Nth hop terminal change communication areas to the distributed control area A2. The terminals from the terminal 10 to the N+3th hop terminal set terminal modes to the distributed control mode.

When the distributed control network is switched to the centralized/distributed control mixed network, ranges of the centralized control area A1 and the distributed control area A2 can be determined in advance. However, the range of the centralized control area A1 and the distributed control area A2 can also be determined according to a network state. As an example, a method of determining the Nth hop terminal in a boundary between the centralized control area A1 and the distributed control area A2 according to a network state is explained.

Figure 9:
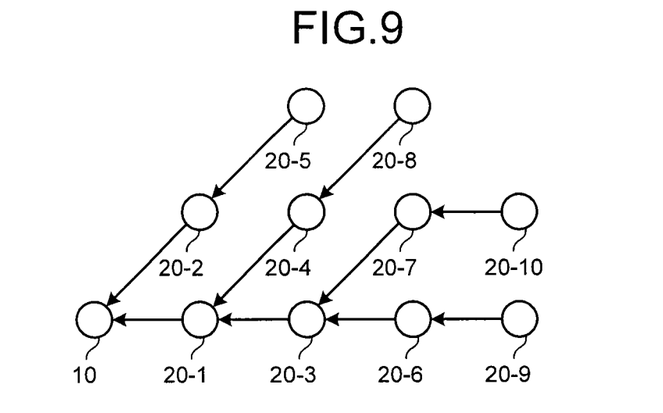
FIG. 9 is a diagram of an example of network topology of a communication system in the second embodiment.

FIG. 9 is a diagram of an example of network topology of the communication system in this embodiment. The terminal 10 retains route information to the terminals 20 when routes are built. Each of terminals 20-1, 20-2, ..., and 20-10 is one of the terminals 20 shown in FIG. 2. The communication managing unit 7 of the terminal 10 calculates, on the basis of transmission sources of DATA received from the terminals 20-1, 20-2, ..., and 20-10 and retained communication routes, the numbers of packets (including relayed packets) received by the terminals 20-1, 20-2, ..., and 20-10 in a fixed period.

The communication managing unit 7 of the terminal 10 sets, among terminals, the calculated numbers of reception packets of which exceed a threshold, the terminal 20-1, 20-2, ..., or 20-10 having the largest number of hops as a reference terminal. The communication managing unit 7 of the terminal 10 sets, as the centralized control area A1, an area up to the terminal 20-1, 20-2, ... or 20-10, the number of hops of which is the number of hops of the reference terminal+1. Note that the fixed period for the calculation and the threshold are arbitrary.

Figure 10:
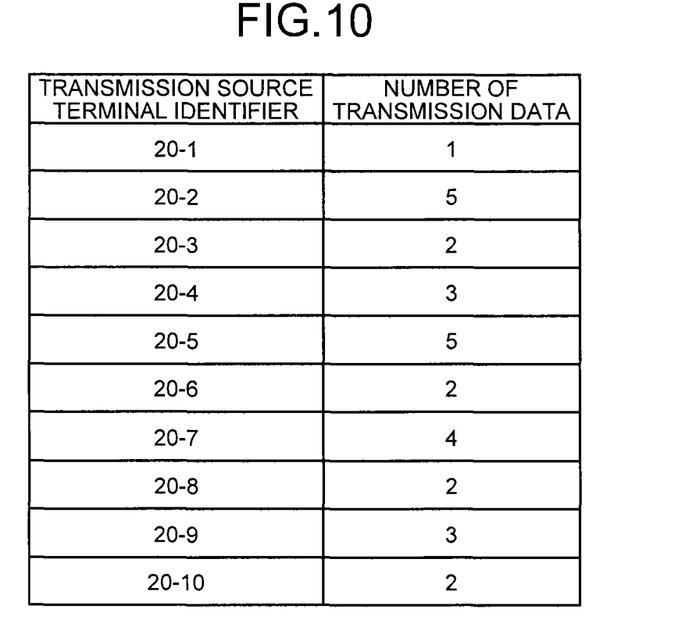
FIG. 10 is a diagram of an example of the numbers of packets transmitted by terminals in a fixed period.
Figure 11:
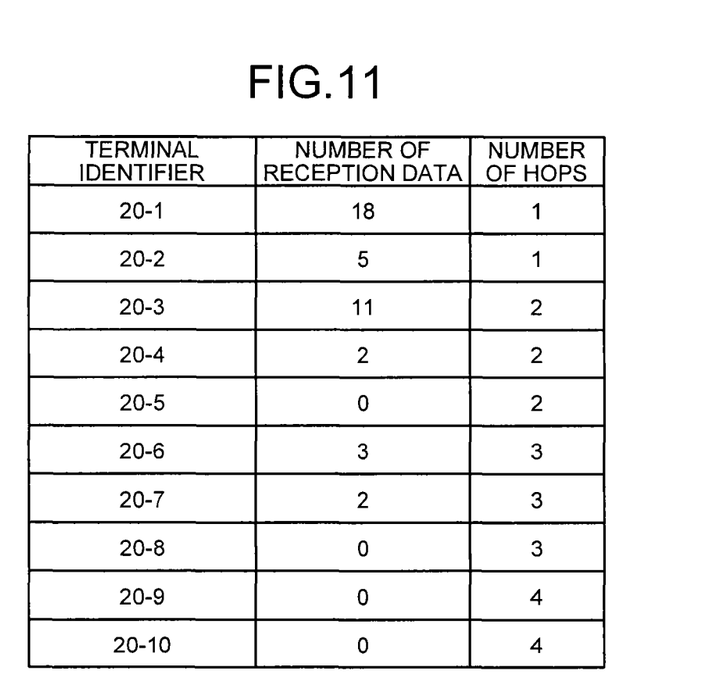
FIG. 11 is a diagram of an example of the numbers of pieces of reception data from the terminals and the numbers of hops of the terminals.

For example, when the numbers of packets transmitted by the terminals in the fixed period in the topology shown in FIG. 9 are values shown in FIG. 10, the terminal 10 calculates a result shown in FIG. 11 on the basis of reception data from the terminals 20-1, 20-2, ..., and 20-10. FIG. 10 is a diagram of an example of the numbers of packets transmitted by the terminals 20-1, 20-2, ..., and 20-10 in the fixed period. FIG. 11 is a diagram of an example of the numbers of reception data (DATA) (including relayed data) from the terminals 20-1, 20-2, ..., and 20-10 and the numbers of hops of the terminals (the numbers of hops from the terminal 10).

When the threshold of the number of reception packets is set to 10, according to FIG. 11, the terminals 20-1 and 20-3 exceed the threshold. Of the terminals 20-1 and 20-3, the terminal having the largest number of hops is the terminal 20-3. An area up to a 3rd hop terminal having the number of hops obtained by adding 1 to the number of hops of the terminal 20-3 is set as the centralized control area A1. In the above explanation, the numbers of reception packets of the terminals 20-1, 20-2, ..., and 20-10, which relay data, are calculated on the basis of the number of packets received by the terminal 10. However, the terminals 20-1, 20-2, ..., and 20-10 can individually measure the numbers of reception packets in the fixed period and transmit a measurement result to the terminal 10. The terminal 10 can determine a centralized control area on the basis of a measurement value received by the terminal 10.

When the distributed control network is switched to the centralized/distributed control mixed network, the general communication period and the boundary communication period can be determined in advance. However, the general communication period and the boundary communication period can also be determined according to a state of the network. For example, as in the determination method for the centralized control area and the distributed control area, the terminal 10 calculates the numbers of reception packets in a fixed period of the N hop terminals. The terminal 10 sets the terminal 20 having the largest number of reception packets among the N hop terminals as a reference terminal and allocates, to the boundary communication period, time in which the reception packets can be transferred in the reference terminal. A transmission time necessary for the transfer of the reception packets can be calculated from a total data size of the reception packets and communication speed. For example, when it is determined that it takes ten seconds for transfer of packets measured in thirty seconds, a ratio of the general communication period and the boundary communication period can be changed with a ratio of 3:1 set as a reference and taking into account fluctuation in the number of packets. In the example explained above, the ratio of the general communication period and the boundary communication period is determined from the number of packets received by the terminal 10. However, as in the determination method for the centralized control area and the distributed control area, the terminals can measure the numbers of reception packets and transmit measurement information to the terminal 10 and the terminal 10 can determine the ratio on the basis of the measurement information.

In this embodiment, the distributed control network and the centralized/distributed control mixed network are switched. However, during an operation in the centralized/distributed control mixed network, the boundary between the centralized control area A1 and the distributed control area A2 can also be changed according to a state of the network. For example, the N−1th hop terminal in FIG. 3 measures a ratio of NULL DATA to POLLING transmission. According to the measurement, when the ratio of NULL DATA exceeds a threshold, the N−1th hop terminal determines that a communication amount of the network decreases and notifies the data collection terminal 10 of a boundary change request for requesting a reduction of the centralized control area. The Nth hop terminal measures a PER of DATA received from the N+1th hop terminal. When the PER exceeds a threshold, the Nth hop terminal determines that the communication amount of the network increases and notifies the data collection terminal 10 of a boundary changing request for determining an expansion of the centralized control area A1.

The data collection terminal 10, which receives the boundary change request for the centralized control area A1 and the distributed control area A2, transmits a network switching notification, which is the same as the network switching notification for switching from the distributed control network to the centralized/distributed control mixed network. The network switching notification including the number of hops N from the data collection terminal of a terminal in a new boundary between the centralized control area A1 and the distributed control area A1 is transmitted. Consequently, the terminals 20 can perform the notified change (the change between the centralized control area A1 and the distributed control area A2). Note that overhead due to the broadcast can be reduced by setting the broadcast range of the network switching notification to a range up to the N+3th hop terminal when the centralized control area A1 is reduced and setting the broadcast range to a range up to the N+4th hop terminal when the centralized control area A1 is expanded.

It is also possible to change a ratio of the general communication period and the boundary communication period according to a state of the network during an operation in the centralized/distributed control mixed network. For example, when data stored in the buffer cannot be entirely transmitted during the boundary communication period, the N+1th hop terminal in FIG. 3 notifies the data collection terminal of a communication period change request for requesting an expansion of the boundary communication period. The terminal 20 in the centralized area monitors the buffer of the own terminal. When data stored in the buffer exceeds a threshold, the terminal 20 notifies the data collection terminal of a communication period change request for requesting an expansion of the general communication period. The data collection terminal, which receives the communication period change requests for the boundary communication period and the general communication period, increases a designated communication period. When the communication period is increased, if the communication period exceeds a threshold, the data collection terminal reduces one of the communication periods. The data collection terminal, which determines values of the general communication period and the distributed communication period, transmits a network switching notification same as the network switching notification for switching from the distributed control network to the centralized/distributed control mixed network. The network switching notification includes new values of the general communication period and the distributed communication period. Note that it is possible to reduce overhead due to the broadcast by setting a broadcast range of the network switching notification to a range up to the N+3th hop terminal.

Note that, as the references for the various kinds of switching in this embodiment, the PER and the ratio of NULL DATA to POLLING are used. The references are not particularly limited as long as the references are references with which a network state can be determined such as a BER (Bit Error Rate), a RSSI (Received Signal Strength Indicator), and a SINR (Signal Interference Noise Ratio). When NULL data responding to POLLING is not returned, a ratio of non-return of DATA can be used.

Note that, in the above explanation, the switching is determined on the basis of the number of packets. However, the switching can also be determined on the basis of a received data size. Further, the switching can be determined taking into account branching states of routes and the number of terminals.

As explained above, in this embodiment, the distributed control network and the centralized/distributed control mixed network are switched according to a network state. Consequently, when the network is not congested, it is possible to reduce a processing load by the centralized control by performing the distributed control in the terminals. On the other hand, when the network is congested, it is possible to suppress interference near the data collection terminal by performing the centralized control near the data collection terminal where packets increase.

Further, during the operation in the centralized/distributed control mixed network, it is possible to avoid a packet loss due to a buffer overflow by changing the boundary between the centralized control area and the distributed control area and the ratio of the general communication period and the boundary communication period according to a network state.

Even when a terminal not adapted to the centralized control participates in the network, it is possible to cope with the terminal by switching the network to the network in which only the distributed control is performed.

Third Embodiment

Figure 12:
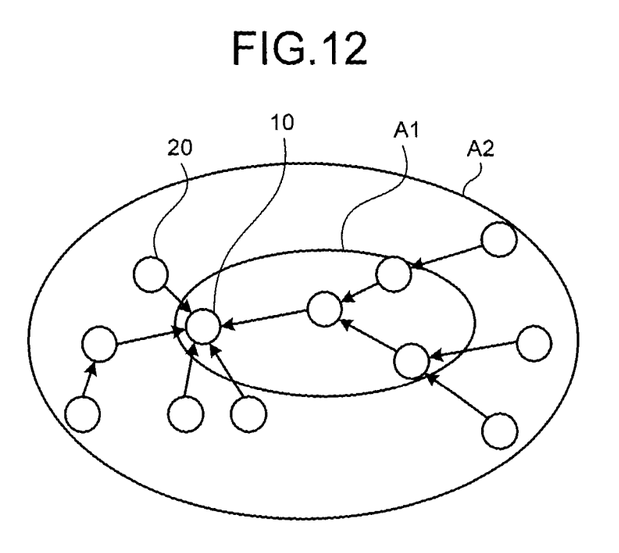
FIG. 12 is a diagram of a configuration example of a communication system in a third embodiment.

FIG. 12 is a diagram of a configuration example of a third embodiment of the communication system according to the present invention. The configurations of terminals (the terminal 10 and the terminal 20) in this embodiment are the same as the configurations in the second embodiment. Differences from the second embodiment are explained below.

In this embodiment, among communication routes between a data collection terminal (the terminal 10) and the terminals 20, only a specific route is a centralized/distributed control mixed network in which centralized control and distributed control are mixed. Communications in the routes other than a target route operate according to the distributed control.

In a state in which a communication route is operating as a distributed control network, the data collection terminal measures a PER as in the second embodiment. However, in this embodiment, the data collection terminal measures a PER of each of the terminals 20 that transmit packets to the data collection terminal. When the measured PER exceeds a threshold, the data collection terminal switches only a route (a specific route) including the terminal 20 having the PER exceeding the threshold from the distributed control network to the centralized/distributed control mixed network.

When switching the distributed control network to the centralized/distributed control mixed network, the data collection terminal broadcasts a network switching notification as in the second embodiment. Note that it is possible to reduce overhead due to the broadcast by setting a broadcast range of the network switching notification to a range up to the N+3th hop terminal. The network switching notification includes identifiers of N−2th to N+3th hop terminals of a target route in which the network is switched. As in the second embodiment, the terminal 20 on the switching target route, which receives the network switching notification, sets a centralized control area and a distributed control area, and further sets a centralized control mode, a distributed control mode, and a time division control mode. Operations in the terminal modes are the same as the operations in the first embodiment.

On the other hand, the terminal 20 on a route other than the target route, which receives the network switching notification, receives POLLING. When the POLLING is not POLLING addressed to the own terminal, the terminal 20 operates to prohibit communication for a fixed period. Consequently, the terminal 20 avoids a situation in which communication of the centralized control is interfered by transmission of a terminal operating according to the distributed control in the same area. The communication stop period by the POLLING can be a predetermined value. Alternatively, a communication prohibition period can be included in POLLING to be transmitted.

In this embodiment, the specific route switched to the centralized/distributed control mixed network can be a plurality of routes centering on the data collection terminal. In this case, the network switching notification can be transmitted by a number equivalent to the routes. Alternatively, information concerning the routes to be switched can be included in one network switching notification.

The data collection terminal measures a ratio of NULL DATA to POLLING for each of the routes switched to the centralized/distributed control mixed network. When the ratio exceeds a threshold, the data collection terminal switches the target route from the centralized/distributed control mixed network to the distributed control network. As in the second embodiment, the data collection terminal performs the switching from the centralized/distributed control mixed network to the distributed control network by transmitting a network switching notification. As in the switching from the distributed control network to the centralized/distributed control mixed network, the network switching notification includes the identifiers of the N−2 to N+3 hop terminals of the target route in which the network is switched. The network switching notification is broadcasted. Note that it is possible to reduce overhead due to the broadcast by setting a broadcast range to a range up to the N+3th hop terminal. A terminal on the target route, which receives the network switching notification, sets an own terminal mode to the distributed control mode. Note that, when a plurality of routes are switched from the centralized/distributed control mixed network to the distributed control network, information concerning the routes can also be included in the network switching notification.

In this embodiment, the PER is used as a switching reference for performing the switching to the centralized/distributed control mixed network. The ratio of NULL DATA to POLLING is used as a reference for switching from the centralized/distributed control mixed network to the distributed control network. However, the references are not particularly limited as long as the references are references with which communication quality can be determined such as a BER and a SINR as in the second embodiment. When NULL data responding to POLLING is not returned, a ratio of non-return of DATA can be used. Further, the switching can be determined taking into account branching states of routes and the number of terminals.

As explained above, in this embodiment, the centralized control and the distributed control are mixed only in the specific route. Consequently, it is possible to reduce terminals in which a control load by the centralized control and a control load by the time division operation increase. Further, the centralized control and the distributed control are mixed in a route having a high communication frequency. Consequently, it is possible to reduce interference near the data collection terminal and improve throughput.

INDUSTRIAL APPLICABILITY (Note 15) The communication system according to Note 11, wherein the communication system sets the reception data amounts as numbers of reception packets.

(Note 16) The communication system according to note 11, wherein the communication system sets the reception data amounts as reception data sizes.

(Note 23) The communication system according to Note 12, wherein the communication system sets the reception data amounts as numbers of reception packets.

(Note 24) The communication system according to Note 13, wherein the communication system sets the reception data amounts as numbers of reception packets.

(Note 25) The communication system according to Note 14, wherein the communication system sets the reception data amounts as numbers of reception packets.

(Note 26) The communication system according to Note 12, wherein the communication system sets the reception data amounts as reception data sizes.

(Note 27) The communication system according to Note 13, wherein the communication system sets the reception data amounts as reception data sizes.

(Note 28) The communication system according to Note 14, wherein the communication system sets the reception data amounts as reception data sizes.

(Note 29) The communication system according to Note 17, wherein the communication system takes into account a data size when determining the communication quality.

(Note 30) The communication system according to Note 17, wherein the communication system sets the communication quality as at least one or more of a PER, a BER, a RSSI, a SINR, and a ratio of a data response to polling.

As explained above, the communication system, the communication terminal, and the communication method according to the present invention are useful for a communication system in which the centralized control and the autonomous distributed control are mixed and is suitable for, in particular, a communication system that performs multihop communication.

REFERENCE SIGNS LIST

1 Control unit
2 Radio unit
3 Antenna
4 Communication-area managing unit
5 Terminal-mode managing unit
6 Transmission-period managing unit
7 Communication managing unit
10, 20, 20-1 to 20-10 Terminals

The invention claimed is:

1. A communication system comprising a plurality of communication terminals, the communication system being capable of setting a centralized control area where centralized control for carrying out communication according to control by a master terminal is carried out and a distributed control area where distributed control for carrying out communication according to autonomous distributed control is carried out, wherein
the communication system sets a terminal mode of the communication terminals including the communication terminal located in a boundary between the centralized control area and the distributed control area to a time division control mode for performing communication in a time division manner, sets the communication terminal in the centralized control area, the terminal mode of which is other than the time division control mode, in a centralized control mode, and sets the communication terminal in the distributed control area, the terminal mode of which is other than the time division control mode, in a distributed control mode,
the communication terminal set in the time division control mode performs transmission in a communication period in which communication is permitted, and
the communication terminal set in the centralized control mode and the communication terminal set in the distributed control mode perform communication without depending on the communication period.

2. The communication system according to claim 1, wherein the centralized control area is configured by the communication terminals, number of hops of which from the master terminal are equal to or smaller than N (N is an integer equal to or larger than 1) hops, and the distributed control area is configured by the communication terminals, numbers of hops of which from the master terminal are equal to or larger than N+1 hops.

3. The communication system according to claim 2, wherein
the communication system sets the communication terminal, a number of hops of which from the master terminal is equal to or smaller than N−3 hops, in the centralized control mode, sets the communication terminal, a number of hops of which from the master terminal is equal to or larger than N+4 hops, in the distributed control mode, and sets the communication terminal, a number of hops of which from the master terminal is N−2 hops to N+3 hops, in the time division control mode.

4. The communication system according to claim 2, wherein, when setting the terminal mode, the communication system determines, on the basis of reception power in the communication terminals, the communication terminal that interferes with communication between the communication terminal, a number of hops of which from the master terminal is N hops, and the communication terminal, a number of hops of which from the master terminal is N+1 hops, and sets the communication terminal in the time division control mode.

5. The communication system according to claim 2, wherein
the communication system sets the communication terminal, a number of hops of which from the master terminal is N hops, and the communication terminal, a number of hops of which from the master terminal is N+1 hops, as boundary terminals, and
in the time division control mode, the communication system switches, in a time division manner, a boundary communication period in which communication between the boundary terminals is permitted and a general communication period in which communication other than the communication between the boundary terminals is permitted.

6. The communication system according to claim 1, wherein, during an operation in the centralized control mode or the time division control mode, the communication system performs, in a transmission opportunity of the own terminal, aggregated transmission or continuous transmission of data accumulated in a buffer.

7. The communication system according to claim 1, wherein
the communication system makes it possible to switch a mixed network configuration including both of the centralized control area and the distributed control area and a distributed control network in which all the communication terminals operate according to the distributed control, and
the communication system switches the mixed network configuration and the distributed control network configuration on the basis of communication quality measured in the communication terminals.

8. The communication system according to claim 7, wherein, during an operation in the distributed control network configuration, the master terminal measures communication quality between the master terminal and the communication terminals, determines switching to the mixed network configuration when the communication quality exceeds a predetermined threshold, and, when the switching is determined, broadcasts a network switching notification including setting information for setting the terminal mode, and the communication terminal, which receives the network switching notification, sets the terminal mode of the own terminal on the basis of the setting information.

9. The communication system according to claim 8, wherein the master terminal determines switching of a route corresponding to the communication terminal, the communication quality of which exceeds the predetermined threshold, from the distributed control network configuration to the mixed network configuration and transmits the network switching notification including information for identifying the target route to be switched, the communication terminal on the target route, which receives the network switching notification, sets the terminal mode on the basis of the setting information, and, when the communication terminal not on the target route, which receives the network switching notification, receives POLLING not addressed to the own terminal, the communication terminal prohibits communication for a fixed period.

10. The communication system according to claim 7, wherein, during an operation in the mixed network configuration, the master terminal measures communication quality of communication by the centralized control between the master terminal and the communication terminals, determines switching to the distributed control network configuration when the communication quality exceeds a predetermined threshold, and, when the switching is determined, broadcasts a network switching notification, and the communication terminal, which receives the network switching notification, sets the mode of the own terminal to the distributed control mode.

11. The communication system according to claim 7, wherein the master terminal calculates, on the basis of packets received from the communication terminals and route information, for each of the communication terminals, an amount of reception data including relayed data received by the communication terminal in a fixed period and determines a range of the centralized control area with reference to a terminal having a largest number of hops from the master terminal among the communication terminals, the calculated reception data amounts of which exceed a predetermined threshold.

12. The communication system according to claim 7, wherein the communication terminal measures an amount of reception data including relayed data received in a fixed period, notifies the master terminal of the measured reception data amount, and determines a range of the centralized control area with reference to a terminal having a largest number of hops from the master terminal among the communication terminals, the notified reception data amounts of which exceed a predetermined threshold.

13. The communication system according to claim 7, wherein the master terminal calculates an amount of reception data including relayed data received by boundary terminals, which are the communication terminals located in the boundary between the centralized control area and the distributed control area, in a fixed period and determines the communication period on the basis of the reception data amount in the boundary terminal having a largest reception data amount among the boundary terminals.

14. The communication system according to claim 7, wherein boundary terminals, which are the communication terminals located in the boundary between the centralized control area and the distributed control area, measure amounts of reception data including relayed data received in a fixed period and notify the master terminal of the measured reception data amounts, and the master terminal determines the communication period on the basis of the reception data amount in the boundary terminal having a largest reception data amount among the notified reception data amounts.

15. The communication system according to claim 7, wherein the communication system takes into account a data size when determining the communication quality.

16. The communication system according to claim 7, wherein the communication system sets the communication quality as at least one or more of a PER, a BER, a RSSI, a SINR, and a ratio of a data response to polling.

17. The communication system according to claim 1, wherein the communication terminal in the centralized control area that directly receives data from a boundary terminal, which is the communication terminal in the centralized control area located in the boundary between the centralized control area and the distributed control area, measures communication quality between the communication terminal and the boundary terminal and requests the master terminal to reduce the centralized control area when the measured communication quality exceeds a predetermined threshold, the boundary terminal measures communication quality between the boundary terminal and a boundary terminal in the distributed control area and requests the master terminal to expand the centralized control area when the measured communication quality exceeds a predetermined threshold, and the master terminal transmits a network switching notification for changing a range of the centralized control area on the basis of the request for the reduction of the centralized control area or the expansion of the centralized control area.

18. The communication system according to claim 1, wherein a boundary terminal, which is the communication terminal in the distributed control area located in the boundary between the centralized control area and the distributed control area, and the communication terminal in the centralized control area monitor buffers of the own terminals and notify the master terminal of buffer amounts when the buffer amounts exceed a predetermined threshold, and the master terminal changes the communication period on the basis of the notification.

19. A communication terminal in a communication system including a plurality of the communication terminals, the communication system being capable of setting a centralized control area where centralized control for carrying out communication according to control by a master terminal is carried out and a distributed control area where distributed control for carrying out communication according to autonomous distributed control is carried out, the communication terminal comprising:
  a terminal-mode managing unit that sets, as a terminal mode, any one of a centralized control mode, a distributed control mode, and a time division control mode for performing communication in a communication period in which the own terminal is permitted to perform communication in a time division manner; and
  a transmission-period managing unit that manages the communication period in which the own terminal is permitted to perform communication and, when the time division control mode is set, manages possibility of transmission from the own terminal according to the communication period, wherein
  the communication terminal carries out, in the centralized control mode, transmission according to the centralized control without depending on the communication period and carries out, in the distributed control mode, transmission according to the distributed control without depending on the communication period.

20. A communication method in a communication system including a plurality of communication terminals, the communication system being capable of setting a centralized control area where centralized control for carrying out communication according to control by a master terminal is carried out and a distributed control area where distributed control for carrying out communication according to autonomous distributed control is carried out, the communication method comprising:
  a mode setting step for setting a terminal mode of the communication terminals including the communication terminal located in the boundary between the centralized control area and the distributed control area to a time division control mode for performing communication in a time division manner, setting the communication terminal in the centralized control area, the terminal mode of which is other than the time division control mode, in a centralized control mode, and setting the communication terminal in the distributed control area, the terminal mode of which is other than the time division control mode, in a distributed control mode;
  a time division transmission step at which the communication terminal set in the time division control mode performs transmission in a communication period in which communication is permitted; and
  a non-time division transmission step at which the communication terminal set in the centralized control mode and the communication terminal set in the distributed control mode perform communication without depending on the communication period.

* * * * *